United States Patent Office 3,433,679
Patented Mar. 18, 1969

3,433,679
PRIMARY ALKALINE CELL
Martin H. Johnson, Verona, and Patrick J. Spellman, Madison, Wis., assignors, by mesne assignments, to E&B Incorporated, Philadelphia, Pa., a corporation of Delaware
No Drawing. Filed July 20, 1966, Ser. No. 566,478
U.S. Cl. 136—102                    12 Claims
Int. Cl. H01m 43/02

ABSTRACT OF THE DISCLOSURE

A primary alkaline cell having improved initial capacity and stability during storage or shelf life provided by the presence of lithium ions in the alkaline electrolyte. These alkaline cells comprise a positive active material, a zinc negative active material, a separator between the positive and negative active materials and a sodium or potassium hydroxide electrolyte solution contained substantially wholly within the separator and the positive and negative electrodes. The higher initial capacity and improved stability during storage are provided by the presence of a lithium additive in amounts ranging from at least about 0.01% by weight up to saturation of lithium ions in the alkaline electrolyte. The lithium additive can be added to any one or more of the cell components so long as it forms an effective concentration of lithium ions in the alkaline electrolyte.

---

This invention relates to a primary alkaline cell and in particular, to a primary alkaline cell containing lithium ions in the alkaline electrolyte which is characterized by an improved initial capacity and improved stability during storage or shelf life.

In the electric battery art, it is well known that alkaline cells comprising a positive active material, a negative active material, a separator and an alkaline electrolyte are unstable during storage, and particularly at high temperatures. During storage, the highly reactive negative active material (e.g. zinc) tends to oxidize which reduces its electrochemical capacity, and therefore, the capacity of the cell is reduced. In addition, some separator materials also tend to oxidize during storage, particularly cellulosic separator materials, causing separator deterioration and in extreme cases short circuiting of the cell. This problem of instability during storage is particularly troublesome in primary alkaline cells which are not rechargeable, since the capacity lost during storage cannot be recovered. As a result, primary alkaline cells which are stored or on the shelf for substantial periods of time have a reduced capacity and are likely to give poor service life.

It is an object of this invention to provide a primary alkaline cell having improved stability during storage or shelf life.

Another object of the invention is to provide a primary alkaline cell having improved initial capacity.

A further object is to provide an improved silver oxide-zinc alkaline cell.

A still further object of the invention is to provide a method for improving the initial capacity and/or the stability during storage or shelf life of a primary alkaline cell.

Other objects and advantages of this invention may be determined from the following clear and complete description of the invention.

It has been discovered that certain primary alkaline cells containing lithium ions in the alkaline electrolyte have improved initial capacity and stability during storage or shelf life. The alkaline cells of this invention generally comprise a positive active material, a zinc negative active material, a separator placed between the positive active material and the zinc active material, and a sodium or potassium hydroxide electrolyte solution in a limited amount sufficient only to provide wetting of the cell components without establishing a liquid level of free electrolyte in the cell. It has been found that the lithium additive can be added to any one or more of the cell components so long as it forms an effective concentration of lithium ions in the alkaline electrolyte.

The lithium additive which is incorporated into the cell to improve stability during storage and initial capacity must be sufficiently soluble in the alkaline electrolyte to provide an effective concentration of lithium ions in the electrolyte. Examples of lithium additives which have been found to improve initial capacity include lithium (Li), lithium hydroxide (LiOH), hydrated lithium hydroxide (LiOH·H$_2$O), hydrated lithium sulfate (Li$_2$SO$_4$·H$_2$O), hydrated lithium acetate (LiC$_2$H$_3$O$_2$·2H$_2$O), lithium carbonate (Li$_2$CO$_3$), hydrated lithium chromate (Li$_2$CrO$_4$·2H$_2$O)

lithium chloride (LiCl), lithium phosphate (Li$_3$PO$_4$), hydrated lithium citrate (Li$_3$C$_6$H$_5$O$_7$·4H$_2$O), hydrated lithium formate (LiCHO$_2$·H$_2$O) and lithium nitrate (LiNO$_3$). Of course, the lithium additive which is incorporated into the alkaline cell should not include an anion concentration which will adversely affect the cell performance.

An important feature of the present invention is the incorporation of a lithium additive into a primary alkaline cell which is sufficiently soluble in the alkaline electrolyte to form an effective amount of lithium ion in the electrolyte. It has been found that very small amounts of lithium ion will provide some improvement in initial capacity and/or stability during storage, but in order to effect a significant improvement, it is generally preferred that the electrolyte contain at least about 0.01% lithium by weight of alkaline electrolyte, with 0.05% lithium being particularly preferred. The optimum amount of lithium required to improve initial capacity and stability during storage will vary depending upon electrode materials, electrolyte concentration and cell size, but it has generally been found that only small amounts are required to provide substantial improvement. It is preferred that the amount of lithium in the electrolyte be kept to a minimum in order to reduce any adverse effects on cell performance.

The positive electrode of an alkaline cell made in accordance with this invention generally comprises a positive active material such as silver oxide, mercuric oxide, manganese dioxide and cupric oxide, though it is not limited to these particular materials. The positive active material is generally used in the form of finely divided particles. Many of the positive active materials have poor electrical conductivity, and therefore, it is conventional practice to incorporate a conductive ingredient such as graphite, carbon black or acetylene black particles into the positive active material.

The negative electrode is prepared from zinc active material and may be in the form of a zinc foil or finely divided zinc particles. It is generally preferred that the zinc active material should be amalgamated regardless of the form which is used.

Between the positive active material and the zinc negative electrode, there is placed a separator which may comprise any of the materials conventionally used as separator for alkaline cells. Generally, the separator is made from a cellulosic material, but non-cellulosics such as microporous polyethylene may also be used. It is conventional to use a plurality of layers of separator material including an absorbent material for holding electrolyte and one or more layers of barrier material for preventing the passage of metallic ions from one electrode to the other. Cellophane is generally used as the barrier material in alkaline cells.

The cells of this invention utilize a conventional alkaline electrolyte comprising a solution of potassium or sodium hydroxide, with potassium hydroxide being preferred. The electrolyte present in these cells is limited to an amount sufficient only to provide wetting of the cell components without establishing a liquid level of free electrolyte in the cell, i.e. the electrolyte is contained substantially wholly within the separator and the positive and negative electrodes. Cells of this invention may also employ a combination zinc negative active material-electrolyte member such as disclosed in U.S. Patent No. 2,593,893 issued to Bernard H. King on Apr. 22, 1952. The alkaline electrolyte may be prepared in accordance with U.S. Patent No. 2,422,045 issued to Samuel Ruben on June 10, 1947 and contains in solution a substantial quantity of zinc in the form of zincate ions. Alkaline electrolytes generally have alkali concentrations ranging from 20 to 50% by weight, and the lithium additives have been found to be particularly effective at the higher concentrations such as 45% solutions. If the alkaline solution is not initially saturated with zincate a portion of the zinc active material may be dissolved during storage until the electrolyte becomes saturated with zincate. Also, the zinc hydroxide formed on the zinc negative active material during initial discharge of the cell may be dissolved until the electrolyte becomes saturated with zincate. In any event, it is generally preferred to start with electrolyte which is substantially saturated (more than 50%) with zincate in order to inhibit dissolution of the zinc active material.

As previously indicated, the lithium additive has been found to be effective for improving initial capacity and stability during storage whether added to the electrolyte, the positive active material, zinc active material or separator, so long as it is sufficiently soluble to provide an effective lithium concentration in the electrolyte. Since the lithium ion concentration must be established in the electrolyte, it is generally preferred to add it directly to the electrolyte, for in this manner, the lithium concentration can be more exactly controlled. Furthermore, some of the lithium additives found to be effective are not readily soluble in the electrolyte, and in order to provide an effective amount in the electrolyte, it may be necessary to add these materials directly to the electrolyte. In some instances, it may be necessary to heat the electrolyte to increase the rate of solution of the lithium additive. For these reasons, it is generally preferred to use lithium additives which are readily soluble in the alkaline electrolyte. Lithium may also be incorporated into an alkaline cell by treating the separator barrier material and/or the absorbent material with a solution containing lithium ions.

The lithium additives improve both the initial capacity of the alkaline cells and the stability during storage or shelf life. As a result of this improvement, alkaline cells containing lithium ions in the electrolyte in accordance with this invention have substantially improved service life (capacity) after long periods of shelf life as compared to cells which do not contain lithium ions in the electrolyte.

The improvement in initial capacity and stability during storage provided by the lithium additives of this invention will be illustrated in the following examples in which each result represents a 3 cell average unless otherwise indicated. The size of the cells which were tested are given as National Bureau of Standards (N.B.S.) sizes if such a size has been established.

Example I

Alkaline electrolyte containing hydrated lithium hydroxide was also tested in an N.B.S. size M–15 mercuric oxide (HgO)-zinc primary alkaline system. The electrolyte concentration was 45% KOH, and the electrolyte solution was 53% saturated with zinc oxide. The cells were discharged 16 hours/day through a 625 ohm load, with the total hours to 1.10 and 0.90 volt endpoints used to measure the cell initial capacity. In addition, cells were stored for 12 weeks at 113° F. prior to testing their capacity in order to determine the effect of the lithium additive on stability during storage or shelf life.

| Additive | Electrolyte Concentration | Initial Capacity | | 12 wks. at 113° F | |
|---|---|---|---|---|---|
| | | 1.10 v. | 0.90 v. | 1.10 v. | 0.90 v. |
| None | 45% KOH | 78.9 | 80.9 | 73.9 | 80.2 |
| 0.1% Li | do | 84.2 | 90.2 | 86.7 | 90.2 |
| 0.2% Li | do | 92.1 | 96.7 | 80.0 | 86.9 |

These test results demonstrate that the hydrated lithium hydroxide improved both the initial capacity and the stability during storage at 113° F. It should be noted that the primary alkaline cells deteriorated more rapidly at elevated temperatures than at normal room temperature.

Example II

N.B.S. size S–5 silver oxide ($Ag_2O$)-zinc primary alkaline cells were used to test the effectiveness of hydrated lithium hydroxide ($LiOH \cdot H_2O$) and hydrated lithium sulfate ($Li_2SO_4 \cdot H_2O$) in 45% potassium hydroxide solution. The hydrated lithium hydroxide was added to the electrolyte in amount of 5 g./liter and 10 g./liter which corresponds to a concentration of lithium in the electrolyte of 0.05% and 0.1% respectively. 10 g./liter of hydrated lithium sulfate was added to the electrolyte, but this was in excess of saturation and some of the lithium sulfate remained undissolved in the electrolyte. The cells were discharged 16 hours/day through a 1500 ohm load. The cells were tested for initial capacity and stability during storage at 113° F. by recording the total hours to 1.40 and 0.90 volt endpoints.

| Additive | Initial Capacity | | 12 wks. at 113° F. | |
|---|---|---|---|---|
| | 1.40 v. | 0.90 v. | 1.40 v. | 0.90 v. |
| None | 51.0 | 72.4 | 37.1 | 49.6 |
| $LiOH \cdot H_2O$ (5 g./l.) | 65.8 | 79.2 | 54.0 | 67.2 |
| $LiOH \cdot H_2O$ (10 g./l.) | 70.7 | 80.2 | 63.6 | 72.5 |
| $LiSO_4 \cdot H_2O$ (10 g./l.) | 72.0 | 78.3 | 63.9 | 74.8 |

The results demonstrate the effectiveness of hydrated lithium hydroxide and hydrated lithium sulfate for improving the initial capacity and stability during storage.

Example III

The effectiveness of hydrated lithium hydroxide in an N.B.S. size S–15 silver oxide-zinc alkaline cell was also tested. 1% by weight of $LiOH \cdot H_2O$ was added to the electrolyte which corresponds to a lithium concentration of about 0.15%. These cells were tested for initial capacity and stability during storage using 300 ohm, 625 ohm and 1500 ohm 16 hour/day discharges.

| Additive | Discharge Load | Initial Capacity | | 12 wks. at 113° F. | |
|---|---|---|---|---|---|
| | | 1.40 v. | 0.90 v. | 1.40 v. | 0.90 v. |
| None | 300 ohm | 20.9 | 35.4 | 12.7 | 19.6 |
| 1% $LiOH \cdot H_2O$ | do | 26.4 | 35.9 | 25.1 | 29.7 |
| None | 625 ohm | 50.0 | 69.4 | 58.3 | 63.1 |
| 1% $LiOH \cdot H_2O$ | do | 64.0 | 79.2 | 70.8 | 73.8 |
| None | 1,500 ohm | 44.7 | 69.4 | 46.7 | 53.0 |
| 1% $LiOH \cdot H_2O$ | do | 59.7 | 78.9 | 65.8 | 70.8 |

The results indicate that the cells containing hydrated lithium hydroxide had both improved initial capacity and improved stability during storage at 113° F.

Example IV

A series of lithium additives were tested for their ability to improve the initial capacity of N.B.S. size S–5 silver oxide (Ag$_2$O)-zinc alkaline cells. The lithium additives were all added to the electrolyte which also contained 7.6% ZnO. Two series of tests were run with the cells in both being subjected to a 1500 ohm 16 hour/day discharge to a 0.90 volt endpoint. The following lithium compounds were evaluated:

| Lithium Additive | Percent Lithium in Electrolyte | Series 1, 0.90 v. | Series 2, 0.90 v. |
| --- | --- | --- | --- |
| None | 0 | 69.7 | 73.7 |
| LiOH·H$_2$O | 0.05 | 79.3 | 78.9 |
| Do | 0.10 | 82.7 | 81.4 |
| Do | (¹) | 81.5 | 81.6 |
| LiOH | 0.05 | 80.0 | 76.3 |
| Do | 0.10 | 82.8 | 81.1 |
| Do | (¹) | 82.7 | 81.4 |
| LiC$_2$H$_3$O$_2$·2H$_2$O | 0.05 | 78.8 | 74.4 |
| Do | 0.10 | 77.4 | 77.6 |
| Li$_2$CO$_3$ | 0.05 | 78.8 | 77.5 |
| Do | 0.10 | 79.8 | 81.3 |
| Li$_2$CrO$_4$·2H$_2$O | (³) | 81.1 | 77.6 |
| LiCl | 0.05 | 73.7 | 77.6 |
| Do | (²) | 78.7 | 81.4 |
| Li$_3$PO$_4$ | (³) | 75.0 | 76.7 |
| Li$_3$C$_6$H$_5$O$_7$·4H$_2$O | 0.05 | 78.8 | 77.6 |
| Do | (²) | 79.3 | 77.5 |
| LiCHO$_2$·H$_2$O | 0.05 | 75.0 | 75.0 |
| Do | 0.10 | 78.8 | 79.0 |
| Do | 0.30 | 73.5 | 76.3 |
| LiNO$_3$ | 0.05 | 74.9 | 76.5 |
| Do | 0.10 | 77.5 | 78.8 |
| Do | (¹) | 77.3 | 78.8 |
| Li | ⁴0.05 | 77.6 | 78.9 |
| Li | ⁴0.10 | 78.7 | 81.5 |

¹ Saturated solution at room temperature. All these solutions contain less than 0.3% lithium but more than 0.1% lithium.
² Saturated solution at room temperature. All these solutions contain less than 0.1% lithium but more than 0.05%.
³ Saturated solution at room temperature. All these solutions contain less than 0.05% lithium.
⁴ Lithium was added directly to the electrolyte and displaced some of the zinc from solution. This electrolyte is thus different from the control in that the zinc oxide concentration is changed.

The test results indicate that all of the cells containing lithium additives showed some improvement over the cells which contained no lithium additive.

Example V

The addition of a lithium additive to the positive active material and the zinc active material was also evaluated. N.B.S. size S-5 silver oxide (Ag$_2$O)-zinc alkaline cells were used for the evaluation. Lithium phosphate (Li$_3$PO$_4$)

was chosen as representative of the lithium additives which are relatively insoluble in the alkaline electrolyte and hydrated lithium hydroxide as a readily soluble additive. The cells were subjected to a 1500 ohm 16 hour/day discharge to a 0.90 volt endpoint.

| Additive | Percent Lithium in Component | Added to | Initial Capacity, 0.90 v. |
| --- | --- | --- | --- |
| None | 0 | | 69.7 |
| Li$_3$PO$_4$ | ¹ 0.007 | Ag$_2$O | 76.3 |
| LiOH·H$_2$O | ¹ 0.007 | do | 79.8 |
| Li$_3$PO$_4$ | ² 0.07 | Zn | 76.1 |
| LiOH·H$_2$O | ² 0.07 | Zn | 81.3 |

¹ This amount of lithium reported as percent of electrolyte in the cell would be 0.05%.
² This amount of lithium reported as percent of electrolyte in the cell would be 0.5% (i.e. saturated).

Both lithium additives yielded improved initial capacity though the readily soluble hydrated lithium hydroxide was better than the lithium phosphate.

Example VI

N.B.S. size S-5 silver oxide-zinc alkaline cells were tested by adding LiOH·H$_2$O to the alkaline electrolyte which was a 35% KOH solution. The cells were tested for initial capacity using a 1500 ohm 16 hour/day discharge and recording the total hours to 1.40 volt and 0.90 volt endpoints.

| Grams LiOH·H$_2$O Per Liter of Electrolyte | Percent Li in Electrolyte | 1.40 Volt | 0.90 Volt |
| --- | --- | --- | --- |
| 0 | 0 | 59.4 | 62.1 |
| 10 | 0.12 | 68.1 | 69.9 |
| 20 | 0.24 | 72.2 | 74.4 |
| 40 | 0.48 | 73.3 | 76.3 |

This clearly demonstrates the effectiveness of the hydrated lithium hydroxide for improving initial capacity.

Having completely described this invention, what is claimed is:

1. A primary alkaline cell including the following components:
   (a) positive active material;
   (b) zinc negative active material;
   (c) a separator placed between said positive active material and said zinc negative active material;
   (d) alkaline electrolyte comprising a 20 to 50% by weight aqueous solution of potassium hydroxide or sodium hydroxide;
   characterized by:
   (1) said alkaline electrolyte being present in an amount sufficient only to provide wetting of the cell components without establishing a liquid level of free electrolyte in the cell such that the electrolyte is contained substantially wholly within the separator and the positive and negative electrodes;
   and further characterized by:
   (2) a higher initial capacity and improved stability during storage provided by the presence of a lithium additive in amounts ranging from at least about 0.01% by weight up to saturation of lithium ions in said alkaline electrolyte.

2. An alkaline cell in accordance with claim 1 in which the lithium additive is added to said alkaline electrolyte.

3. An alkaline cell in accordance with claim 1 in which the lithium additive is hydrated lithium hydroxide.

4. An alkaline cell in accordance with claim 1 in which the positive active material is silver oxide.

5. An alkaline cell in accordance with claim 1 in which the lithium additive is incorporated into one of said components in an amount sufficient to provide from at least about 0.05% by weight up to saturation of lithium ions in said alkaline electrolyte which also contains a substantial amount of zinc in the form of zincate ions to minimize dissolution of said zinc negatve active material in the electrolyte.

6. An alkaline cell in accordance with claim 5 in which the lithium additive is added to said alkaline electrolyte.

7. An alkaline cell in accordance with claim 5 in which the lithium additive is hydrated lithium hydroxide.

8. An alkaline cell in accordance with claim 5 in which the positive active material is silver oxide and the lithium additive is added to the electrolyte.

9. A method for improving the initial capacity and stability during storage of a primary alkaline cell having the following components:
   (a) positive active material;
   (b) zinc negative active material;
   (c) a separator placed between said positive active material and said zinc negative active material;
   (d) alkaline electrolyte which is a potassium hydroxide or sodium hydroxide solution present in an amount sufficient only to provide wetting of the components without establishing a liquid level of free electrolyte in the cell such that the electrolyte is contained substantially wholly within the separator and the positive and negative electrodes;
   which comprises adding a lithium additive to one of said components in an amount sufficient to provide from at least about 0.01% by weight up to saturation of lithium ions in said alkaline electrolyte.

10. A method in accordance with claim 9 in which the lithium additive is hydrated lithium hydroxide.

11. A method in accordance with claim 9 in which the lithium additive is added to the alkaline electrolyte.

12. A method in accordance with claim 9 in which the lithium additive is added in an amount sufficient to provide at least about 0.05% by weight of lithium ions in said alkaline electrolyte.

References Cited

UNITED STATES PATENTS

| | | | |
|---|---|---|---|
| 2,536,699 | 1/1951 | Ruben | 136—107 |
| 2,547,908 | 4/1951 | Fry et al. | 136—155 |
| 2,773,786 | 12/1956 | Jobe | 136—155 |
| 2,766,315 | 10/1956 | Jobe et al. | 136—153 |
| 2,897,249 | 7/1959 | Glicksman et al. | 136—154 |
| 2,993,946 | 7/1961 | Lozier | 136—154 |
| 3,025,336 | 3/1962 | Bartosh et al. | 136—154 |
| 3,043,896 | 7/1962 | Herbert et al. | 136—154 |
| 3,117,032 | 1/1964 | Panzer | 136—154 |
| 3,184,340 | 5/1965 | André | 136—20 |

WINSTON A. DOUGLAS, *Primary Examiner.*

C. F. LE FEVOUR, *Assistant Examiner.*

U.S. Cl. X.R.

136—154

UNITED STATES PATENT OFFICE

CERTIFICATE OF CORRECTION

Patent No. 3,433,679  March 18, 1969

Martin H. Johnson et al.

It is certified that error appears in the above identified patent and that said Letters Patent are hereby corrected as shown below:

In the heading to the printed specification, line 5, "E&B" should read -- ESB --.

Signed and sealed this 31st day of March 1970.

(SEAL)
Attest:

Edward M. Fletcher, Jr.

Attesting Officer

WILLIAM E. SCHUYLER, JR.

Commissioner of Patents